Sept. 29, 1970 R. F. BUNSHAH ET AL 3,531,340

METHOD FOR MOUNTING THIN BERYLLIUM WINDOWS

Filed Dec. 24, 1968

INVENTORS
ROINTAN F. BUNSHAH
ROBERT S. JUNTZ
BY
ATTORNEY

United States Patent Office 3,531,340
Patented Sept. 29, 1970

3,531,340

METHOD FOR MOUNTING THIN BERYLLIUM WINDOWS

Rointan F. Bunshah, Livermore, and Robert S. Juntz, Hayward, Calif., assignors to the United States of America as represented by the United States Atomic Energy Commission Filed Dec. 24, 1968, Ser. No. 786,580
Int. Cl. C23f *1/02*
U.S. Cl. 156—8 7 Claims

ABSTRACT OF THE DISCLOSURE

A method for mounting thin metal windows such as beryllium foils. Beryllium is deposited by plating or evaporating techniques to the required thickness onto a copper sheet. The sheet is then masked along its edges with an acid-resistant material, and the sheet is etched in nitric acid which eats away the copper, except where it is masked, to provide a beryllium foil mounted in a copper frame. A variation of the method is accomplished by first depositing, such as by plating, on a Monel sheet, silver or copper, then plating with beryllium, masking, and etching away the undesired copper or silver and the Monel, to provide a beryllium foil mounted in a Monel frame. The frame, copper or Monel, may then be brazed or soldered to a desired supporting structure for use such as in X-ray or gamma-ray counters.

BACKGROUND OF THE INVENTION

The invention described herein was made in the course of, or under, Contract No. W–7405–ENG–48, with the United States Atomic Energy Commission.

Thin (less than 2 mils) beryllium foils are often used as end windows in X-ray and gamma-ray counters, for example. A problem which arises in making such instruments is that it is difficult to braze such thin foils to the supporting metal. Brazing alloys attack the beryllium foil which results in an imperfect joint, thus producing an unsatisfactory end product.

While much prior effort has been directed to various brazing techniques to overcome this problem, they have not produced satisfactory results.

SUMMARY OF THE INVENTION

The present invention eliminates the prior problems involved in brazing thin beryllium foils to a support structure, by avoiding direct brazing of the foil and providing beryllium foils firmly mounted in a supporting structure. This is accomplished by depositing such as by plating or evaporating beryllium of a desired thickness onto a supporting structure, masking certain areas, and removing, by appropriate etching solution, the unmasked supporting structure, leaving the thin beryllium layer or foil firmly attached to the supporting structure. The structure can then be brazed or soldered to the instrument or other point of use.

Therefore, an object of the invention is to provide a method for mounting thin beryllium foils.

Another object is to provide a supporting structure with a thin metal window firmly secured thereto.

Another object of the invention is to provide a novel method for mounting thin beryllium foils which involves the techniques of plating or evaporating beryllium onto a support structure, masking certain areas, and removing the undesired areas of the support structure.

Other objects and advantages of the invention will become readily apparent from the following description taken in conjunction with the accompanying drawings.

DESCRIPTION OF THE INVENTION

The present invention provides a method for firmly mounting a beryllium foil in a copper frame, the frame being adapted to be bonded or otherwise secured to a supporting structure. The beryllium is plated, evaporated or otherwise deposited to the required thickness, for example, less than two mils, on a copper sheet. The edges of the sheet are then masked off with an acid-resistant tape, for example, and the sheet is etched in nitric acid which eats away the copper, except the masked edges, to expose the beryllium foil. The result is a beryllium foil firmly mounted in a copper frame which can then be secured by conventional means to a desired supporting structure or other point of use.

Figure 1:
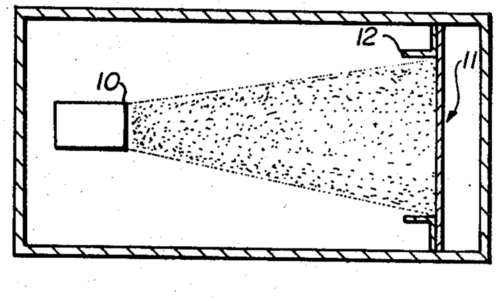
FIGS. 1–4 illustrate various steps of the operational sequence of the inventive method.
Figure 2:
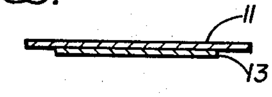

For purpose of illustrating the inventive method described directly above, the following sequence of operational steps are set forth and partially illustrated in FIGS. 1–4 as exemplary only:

(1) As shown in FIG. 1, beryllium from a vapor source 10 is deposited on one surface of a copper sheet or receiver 11, a shield 12 being positioned adjacent the sheet 11 to prevent undesired spreading of the beryllium being deposited or to define a desired pattern of beryllium on sheet 11. The beryllium is deposited to a desired thickness, for example, less than 2 mils, and the shield 12 is removed leaving a layer 13 of beryllium on one surface of the copper sheet or receiver 11 as shown in FIG. 2. The depositing technique is conventional in the art and need not be discussed in detail since the details thereof do not constitute part of the invention.

Figure 3:
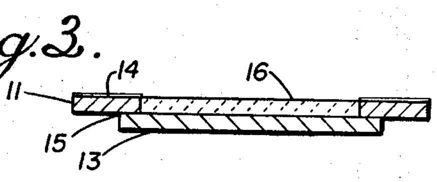

(2) As illustrated by an enlarged view in FIG. 3, the areas indicated at 14 of copper sheet 11 which are to serve as the frame or mounted for the beryllium layer 13, having an interface bond 15 therebetween, are masked by a suitable maskant which is resistant to the etching solution, such as nitric acid, which is utilized to remove the undesirable areas of the copper sheet 11.

Figure 4:
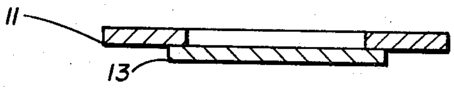

(3) The area of copper sheet 11, indicated at 16 in FIG. 3, is etched out by applying a suitable solution of nitric acid as known in the art, or other satisfactory etching solution, but which does not effect beryllium, thereby exposing the area of the beryllium layer 13 located therebeneath, thus leaving a beryllium window in layer 13 which is exposed on both sides thereof, the outer surfaces or edges of the layer 13 being bonded to the copper frame formed from copper sheet 11 as illustrated in FIG. 4.

(4) The maskant is removed from the edges of copper sheet 11, thereby leaving the end product as illustrated in enlarged cross-section in FIG. 4. The copper frame formed from sheet 11 may then be secured by suitable means, such as brazing, to the desired support structure at the point of use.

A variation of the above described method can be utilized to mount a beryllium foil in a Monel metal frame for bonding or otherwise securing to a supporting structure. The variation may be desirable in certain applications because Monel matches the coefficient of thermal expansion of beryllium. The problem, as previously pointed out, is that it is difficult to braze thin beryllium foil directly to Monel metal. The solution is to plate or otherwise deposit a Monel sheet with copper or silver, as conventionally known, and plate or evaporate beryllium onto the plated Monel sheet to the required thickness. The edges of the sheet are masked, and the Monel and copper or silver is removed in a suitable etching solution, such as nitric acid. This forms a beryllium foil mounted in a Monel metal frame. The Monel frame is easily brazed to the supporting structure by conventional brazing techniques.

The operational sequence of steps for an example using, the variation of the novel method is similar to that described above and partially illustrated in FIGS. 1–4 except that prior to depositing the layer of beryllium on the copper, the copper is first deposited on a sheet of Monel by conventional techniques known in the art, and then the beryllium is deposited on the copper, the edges masked, the central portion of the Monel and copper is etched away such as by a suitable nitric acid solution as commonly known, the masking is then removed leaving a window of beryllium bonded to a frame or mounted on Monel metal which may be readily brazed or otherwise secured to a support structure.

It has thus been shown that the present invention provides a unique solution to the problem of attaching a beryllium foil to a frame by eliminating brazing of the beryllium to the frame which may, for example, be copper or Monel, the frame then being secured to a support structure.

While the inventive process is particularly adapted to thin beryllium foils, it may be readily utilized to produce thicker foils on metallic frames, if desired.

While a particular method and variation thereof have been described, modifications will become apparent to those skilled in the art, and it is intended to cover in the appended claims all such modifications as come within the true spirit of the invention.

We claim:

1. A method for mounting thin beryllium foil in a supporting frame comprising the steps of: depositing beryllium to the desired thickness onto a sheet of metal which constitutes a frame which can be easily secured to an associated supporting structure; masking the edges of the sheet with an etchant-resistant material; etching the masked sheet in a solution which dissolves the metal but does not dissolve the beryllium deposited thereon; removing the masking material from the edges of the metal sheet to provide a beryllium foil mounted in a metal frame.

2. The method defined in claim 1, additionally including the step of securing the metal frame to a supporting structure.

3. The method defined in claim 1, wherein the sheet of metal is copper.

4. The method defined in claim 1, wherein the beryllium foil is deposited to a thickness of less than 2 mils.

5. The method defined in claim 1, additionally including the steps of: depositing on the sheet of metal a layer of metal selected from the group consisting of copper and silver prior to depositing of the beryllium; then depositing the beryllium upon the selected layer of metal; and etching away the layer of metal in addition to the metal sheet in the unmasked areas thereof.

6. The method defined in claim 5, wherein the sheet of metal is Monel.

7. The method defined in claim 1 or 5 wherein the etching solution contains nitric acid.

References Cited

UNITED STATES PATENTS

| | | | |
|---|---|---|---|
| 2,770,033 | 11/1956 | Zarth | 29—492 X |
| 3,105,294 | 10/1963 | Atkinson | 29—492 X |
| 3,157,879 | 11/1964 | Kuehler | 313—74 X |
| 3,211,937 | 10/1965 | Hester et al. | 313—74 |
| 3,222,558 | 12/1965 | Hueschen | 313—74 X |
| 3,406,304 | 10/1968 | Brewster | 313—74 |

JOHN T. GOOLKASIAN, Primary Examiner

J. C. GAL, Assistant Examiner

U.S. Cl. X.R.

29—488, 492; 156—18; 313—74